United States Patent [19]

Van Daele et al.

[11] Patent Number: 4,748,515
[45] Date of Patent: May 31, 1988

[54] VIDEO OUTPUT SIGNAL CORRECTING METHOD AND APPARATUS

[75] Inventors: Jean A. Van Daele, Bonheiden; Patrick M. Pandelaers, Brussels, both of Belgium

[73] Assignee: Afga-Gevaert N.V., Mortsel, Belgium

[21] Appl. No.: 915,751

[22] Filed: Oct. 6, 1986

[30] Foreign Application Priority Data

Oct. 7, 1985 [EP] European Pat. Off. ............ 85201614

[51] Int. Cl.$^4$ ............................................. H04N 1/10
[52] U.S. Cl. ..................................... 358/293; 358/284
[58] Field of Search ............... 358/293, 284, 166, 169, 358/294, 280

[56] References Cited

U.S. PATENT DOCUMENTS

| | | | |
|---|---|---|---|
| 4,220,978 | 9/1980 | Rhyins | 358/293 |
| 4,228,468 | 10/1980 | Nagano | 358/280 |
| 4,242,578 | 12/1980 | Britz | 358/901 |
| 4,578,711 | 3/1986 | White | 358/293 |

FOREIGN PATENT DOCUMENTS 2064809 6/1981 United Kingdom.

OTHER PUBLICATIONS

Signal Processing, by M. Togashi, et al., 1984 IEEE International Solid-State Circuits Conference, Digest of Technical Papers, First Edition, Feb. 1984, pp. 204-205.

Primary Examiner—Tommy P. Chin
Attorney, Agent, or Firm—A. W. Breiner

[57] ABSTRACT

A method and an apparatus for generating correcting signals for correcting the video output signal of an electro-optical document reading apparatus of the line-wise scanning type are disclosed. The method of the invention employs a successive approximation procedure for determining the correcting factors pertaining to pixels within each scanning line, the checking cycles of the procedures corresponding with each correction word however are nested.

4 Claims, 3 Drawing Sheets

| | MS | SC |
|---|---|---|
| MODE 1 | high | low |
| MODE 2 | high | low |
| MODE 3 | low | ⎍ |

VIDEO OUTPUT SIGNAL CORRECTING METHOD AND APPARATUS

FIELD OF INVENTION

This invention relates to a method and apparatus for generating correcting signals for correcting the video signal output of an electro-optical document reading apparatus.

BACKGROUND OF INVENTION

In an electro-optical document reading apparatus, light is directed onto a document and light quanta reflected from elemental areas (pixels) of the irradiated surface are detected by a light-sensitive sensor and translated into video signals. The sensor may comprise an array of sensor elements, usually solid-state sensor elements such as photodiodes or charge-coupled devices (CCDs).

The output signals of the sensor should be equal when reading uniformly irradiated pixels of the same grey scale value. In practice however, the signals are not equal under those conditions. There are various causes of such discrepancies. In some cases signalling errors occur because of distorting effects of the optical system. When light from a uniformly irradiated surface is projected in reduced scale by an optical focusing system onto an image sensor the light flux on the sensor is greater near the central optical axis than in the peripheral region, due to the so-called cosine-to-the-fourth shading effect of the optical system. Variations in the video signal levels can also occur as a result of imperfections in the sensitivity characteristic of the sensor itself. As is well known, the transducing properties of electro-optical convertors are liable to suffer from one or another kind of defect, depending on their type. Such defects cause inaccuracies in the transducing of the grey level values of incident light signals.

Anomalous variations in the light output from the scanning light source, or obstruction of the emitted light by dirt on the lamp(s) or on the focusing system are further possible causes of inaccuracies in the reader performance.

It has been proposed in this art to compensate for the cosine-to-the-fourth shading effect of the optical system by using a light source with an appropriately non-uniform light output distribution or by providing an appropriately dimensioned light shield in front of the focusing lens or between the lens and the document to be read (see U.S. Pat. No. 4 220 978 and G.B. patent No. A 2 064 809). The compensating effect achieved in these ways does not deal with the other causes of reading errors which have been mentioned.

An image reading apparatus having video signal correcting means which correct for variations in sensor response characteristics and for illumination faults, as well as for cosine-to-the-fourth shading effects is described in U.S. Pat. No. 4 228 426. The correcting means use several pulse generators for generating a plurality of timing signals and therefore involve very complex electronic circuitry.

A correcting system which in principle is potentially more satisfactory was disclosed at the IEEE International Solid-state Circuits Conference by Mitsuo Togashi et al of Matsushita Graphic Communication Systems. Inc. of Japan. This system, which corrects for sensor response defects and cosine-to-the-fourth shading, makes use of a single chip signal-processor. During a first processing step a reference original is read by a sensor and a correction value for the video value pertaining to each pixel is determined and stored. During a second step, the document is read and the output video signal is corrected by amplification of that video signal in each pixel with a corresponding correction factor that was determined in the first step.

The correction factors used in the foregoing system are n-bit binary code correction words. Correction factors as are mentioned in the article by Mitsuo Togashi can be determined by means of the successive approximation technique, known in the art.

According to this technique. each word is developed from an initial value to the required value representing the required correction factor for that pixel by a procedure comprising a sequence of checking cycles. This sequence of checking cycles is performed during the period of time that is available in between the shifting out of the sensors read out register of the video value to which the correction factor is pertaining and of the video value corresponding with the next pixel.

Each checking cycle includes the steps of amplifying the signal delivered by the sensor with an n-bit binary code word initially having its most significant bit set to one and the other bits set to zero to give a modified video response signal and comparing the modified signal with a predetermined reference signal level to give a comparison signal. Each correction word is changed bit by bit as required in dependence on the comparison signals generated in the approximation cycles, thereby each time changing the bit next to the corrected bit in order of decreasing significance into one to bring the word progressively into approximation with the required coded correction factor.

When applying the successive approximation procedure for the development of coded correction factors for the sensor output of an electro-optical reading apparatus, it is necessary to perform at least n x N checking cycles, where n is the number of bits in a correction word and N is the number of pixels to which the sensor is exposed during a reading period. By a reading period of the sensor is meant the period of time for which the sensor or any individual sensor element is continuously irradiated before the accumulated energy is released and shift out as a video signal. N is the number of pixels in a scanned line, in the case of line-wise scanning, and is the number of pixels in a scanned surface area in the case of matrix scanning.

If the correction factors for use in an output correcting method as described in the paper by Mitsuo et al. are to be determined by means of the successive approximation technique, either the shift out period of the sensors shift register is to be extended as long as is needed for the performance of the entire successive aproximation procedure of each correction word pertaining to a pixel in the read line (which solution slows down the operation speed of the scanning device), or alternatively very fast and expensive electronic circuitry is to be used.

There are applications in which the duration of said shift out period has to be kept very short. Fast scanning, for examples, obliges that signals pertaining to scanned data are shifted out rapidly so as to enable reading of new data. In such applications the prior art successive approximation procedure can only be applied when high speed electronic circuitry is used.

SUMMARY OF INVENTION

The present invention provides a method of generating correction factor signals which employs a successive approximation technique. but in a way which enables less expensive circuitry to be used for developing correction words comprising a given number of bits.

According to the method of the present invention correction factors are generated with which the video signal output of an electro-optical document reading apparatus to be amplified in every pixel in order to compensate for apparatus performance anomalies. The method comprises the steps of developing an n-bit binary code correction word for the output value pertaining to each pixel in a reference scanning line or area with which such value has to be amplified to make it substantially equal to a predetermined reference signal level. To develope such correction factors a successive approximation method is used. Said procedure comprising a sequence of checking cycles each including the steps of amplifying the sensor signal responsive to an uniformly irradiated reference line or area with an initial n-bit binary code word having its most significant bit set to one and the other bits set to zero to give a modified video response signal and comparing the modified signal with a predetermined reference signal level to give a comparison signal; and changing the correction words bit by bit in dependence on the comparison signals and by changing the lower significant bit next to the amended bit to one in order to bring each of the words progressively into approximation with the required coded correction factor. According to the present invention the successive approximation procedures for developing the plurality of correcting words are nested by performing in immediate succession to each other the series of checking cycles in respect of the most significant value bits of the different correction words, then performing in immediate succession to each other the series of checking cycles in respect of the next significant value bits of those words and so on until the successive approximation procedures for all the words are completed each series of checking cycles being performed after an exposure of said sensor to said uniformly illuminated reference line or area.

The method of the present invention affords the advantage that at a given shift out period of the sensor. there is no need for high speed electronic circuitry for developing the correction words since during each shift out period only the checking cycles pertaining to a single bit in each correction word are to be performed.

For example, in a line-wise scanning device wherein an entire $A_4$ sized page composed by lines comprising 1728 pixels. is read into a charge coupled device array within 3 sec., pixels are read out of the charge coupled device array at an approximate speed of 1.5 MHz. According to the method prior to this invention, the entire successive approximation procedure comprising a number of checking cycles equal to the number of bits each correction word is composed of, is to be performed within the 660 nsec. period in between the reading out of the video values pertaining to two adjacent pixels. Only very fast electronic circuitry fabricated by means of expensive technology such as ECL technology (Emitter-Coupled Logic), is able to perform the method of the prior art at that high speed. When the method of the present invention is used, there is no need for fast working devices since during 660 nsec only one checking cycle for the correction of a single bit in one correction word is to be performed.

Although successive approximation as a procedural principle is in itself well known, it will be useful to describe by way of example a particular successive approximation procedure involving the progressive development of the eight bit initial correction word 1000 0000 into the form in which it is a coded representation of a required correction factor. The initial correction word 1000 0000 codifies half of the maximum amplification (correction factor) which it is envisaged might be needed. The maximum amplification would therefore be represented by the word 1111 1111. In the first cycle of the successive approximation procedure the initial correction word 1000 0000 is read from storage into a programmable amplifier together with a video signal delivered by a sensor element on exposure to a pixel of a uniformly irradiated reference surface to which an electro-optical document reader is exposed. In the amplifier the video signal is amplified with the correction factor represented by the initial correction word. The amplifier output is compared with a predetermined reference signal level corresponding with that which the sensor response signal would have if it accurately represented the grey scale value of the reference surface. The comparison yields a signal in the form of a bit (hereafter called "compare bit") "1" or "0" depending on whether the amplified signal is below or above the reference level. The compare bit "1" indicates that the amplified signal is too strong whereas "0" indicates that the amplified signal is too weak.

The compare bits generated in this first checking cycle and in each of the following checking cycles which will be performed in respect of the correction word are determinative of changes in the correction word. The compare bit generated in the first cycle determines whether or not the most significant bit of the correction word, represented by digit "1" undergoes change. The compare bit generated in the second cycle determines whether or not a change is effected in what is then the second bit (in order of decreasing significance) of the correction word, and so on. If the compare bit generated in a given cycle is "1" the relevant bit of the correction word is changed from "1" to "0" or "0" to "1" as the case may be. Whereas if the compare bit is "0" the relevant bit of the correction word is left unchanged. However. in each cycle until the successive approximation procedure is completed, irrespective of whether or not the generated compare bit is "1" or "0" the bit immediately following the one which is changed or not changed, depending on the compare bit, is itself changed from "0" to "1".

Applying the foregoing rule : if the compare bit generated in the said first cycle is "1". the most significant bit of the initial correction word becomes changed from "1" to "0". At the same time the next bit in order of decreasing significance becomes changed from "0" to "1". When the second checking cycle is performed in respect of the so amended correction word the second most significant bit of the correction word (which second bit was changed to "1" in the previous cycle) is changed from "1" if the compare bit generated in that second cycle is "1" but is left unchanged if that compare bit is "0". In either case, the third most significant bit of the correction word is changed from "0" to "1". The following bits of the correction words are checked and changed as may be necessary, following the same rule, in the following six checking cycles. The correction word as it stands at the end of the eighth cycle is the developed correction word representing the correction factor required for correcting the video signal output of the sensor element in question. When the document reader is used for reading documents, that particular sensor element will always be exposed to pixels located at one particular place in relation to the axis of the optical projection system.

When applying the approximation procedure of the above example in a reader correcting system as proposed prior to the invention the required number of checking cycles would be performed one after the other in immediate succession to complete development of one of the required correction words, and the cycles would then be repeated the required number of times to develop the remaining correction words one after the other. In contrast, when applying the procedure according to the present invention, performance of the first checking cycle in respect of one correction word is followed by performance, in succession, of the first checking cycles pertaining to the rest of the required correction words. Then the second checking cycles relating to all of the correction words are performed, in sequence after a second reading of the irradiated reference line. And then the third checking cycles are performed in sequence after a third reading etc., and so on.

The method of the present invention is applicabale for generating correcting signals for the video signal output of a document reading apparatus of the line-wise scanning type or matrix scanning type. Line-wise scanning apparatus comprise apparatus wherein the sensor is exposed to the pixels of a line either sequentially or simultaneously. Matrix scanning apparatus comprise apparatus wherein the sensor is exposed to the pixels of an area either sequentially or simultaneously.

Preferably the reference surface providing the line or area of pixels to which the sensor is exposed during the calibration of the reader. i.e. while the correction words are being developed. is a white surface and the reference signal level is the white video level.

A compare bit constituting the comparison signal generated in each of the checking cycles pertaining to each of the correction words can if desired be written into the correction word used in that cycle, in substitution for the least significant bit of that word.

In a preferred calibration system according to the invention the initial correction words, equal in number to the number of reference surface pixels to which the sensor is exposed during a reading period. are written into addresses of a random access memory (RAM); after each checking cycle pertaining to that word and amendment of the word in dependence on the comparison signal generated in that cycle. the word is written back into the RAM; and the reading of the words in succession out of the RAM is synchronised with the transmission of the successive video signals to be amplified by those words.

The invention includes an electro-optical reading apparatus incorporating calibration means constructed to generate correcting signals by a method according to the invention as above defined.

BRIEF DESCRIPTION OF DRAWING

The following is a description of a method and apparatus according to the invention, selected by way of example only, and makes reference to the accompanying drawings, in which.

PRESENTLY PREFERRED EMBODIMENT

Figure 1:
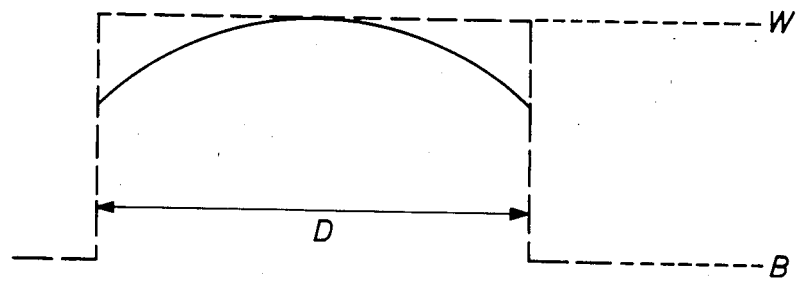
FIG. 1 represents a non-uniform output signal of a solid-state image sensor responsive to exposure to a white reference scanning line.

FIG. 1 shows the output signal of a solid-state image sensor when the light reflected from a uniformly illuminated white line is detected. The output signal should be constant at the white video level W along the document width D and constant at the black video level B outside the document area (as indicated by the broken lines). However, due to reader defects as hereinbefore mentioned that white video level is only reached at the middle of the output signal.

Figure 2:
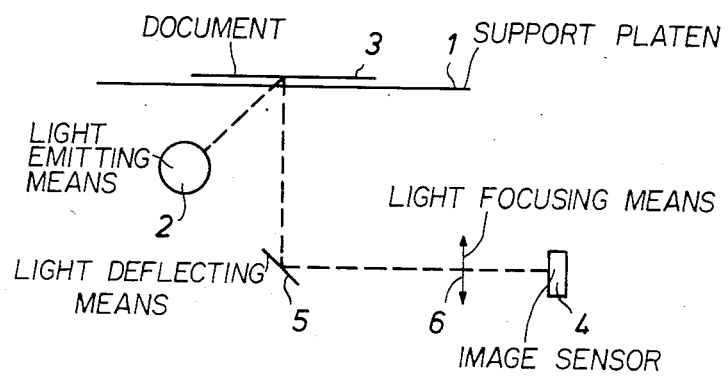
FIG. 2 is a diagrammatic representation of an image scanning apparatus with which a signal correcting method according to the present invention can be used.

FIG. 2 represents a line-wise document scanning system wherein a document 3 to be scanned is positioned on a support platen 1. Light emitting means 2. e.g. a pair of fluorescent lamps, illuminate successively each line on the document. The reflected light is directed to a solid-state image sensor 4. e.g. a linear array of integrated charge coupled devices, by a set of light-directing 5 and light-focusing means 6. The output of solid-state image sensor 4 is an analogue video signal which should at all positions be proportional to the grey scale values of the pixels of a scanned line of the document. Due to the reader defects, e.g. cosine-to-the-fourth shading, a non-linear sensitivity characteristic of the solid-state image sensor and/or non-uniform illumination, errors occur in the detected video signal. This output signal can be corrected by using a supplementary electronic correction circuit which performs a method according to the present invention.

Figure 3:
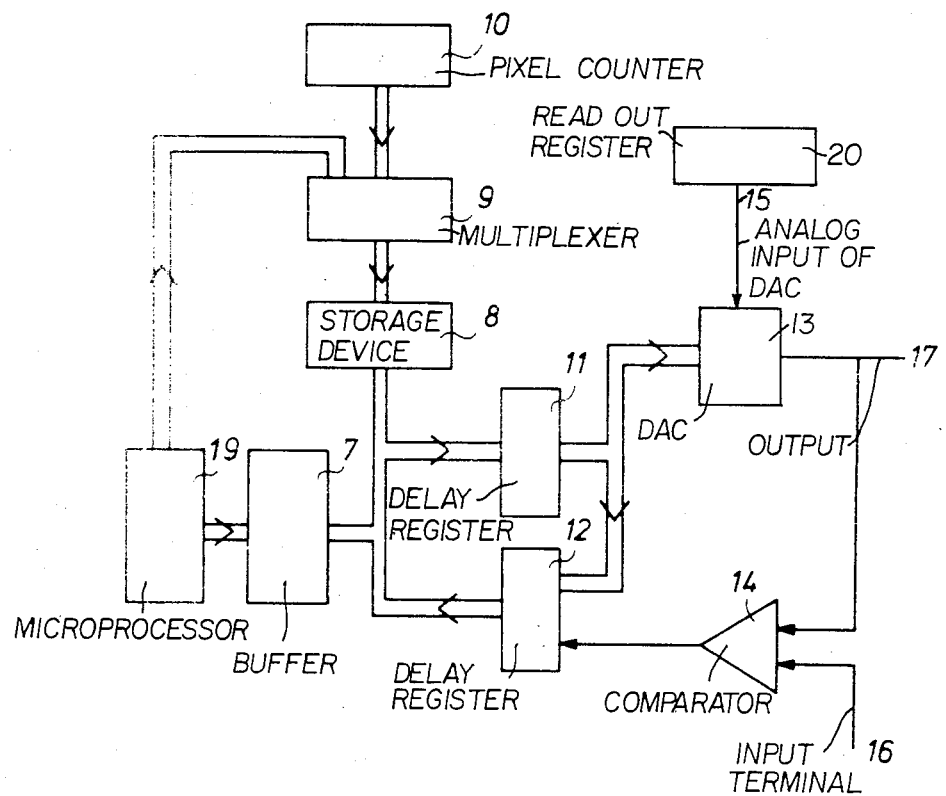
FIG. 3 is a block diagram of a correction circuit for generating correcting signals by a method according to the present invention.

FIG. 3 represents an example of such a correction circuit. The circuit is in this instance for use with a line-wise scanning apparatus.

The circuit can be switched into either the calibration mode, which serves to develop correction words for video values detected in each location within a document, or the document reading mode during which signals corresponding with a scanned and digitized document are corrected by means of the correction words that were developed in the calibration mode.

The circuit is incorporated into an electro-optical document reading apparatus (not shown in FIGS. 3. 4a or 4b). During the major part of the use time of the reader, correction circuit operates in the document reading mode. At intervals of time (which may be regular intervals) the correction circuit is switched into the calibration mode to check and if necessary amend the correction words. The switching between the two said modes is controlled by a microprocessor 19 via a RAM timing generator (not indicated in this figure) that will be explained with reference to FIG. 4.

At the start of operation in the calibration mode a storage device 8 is filled with a number of initial digital correction words. In this example they are eight-bit words. The number of such words is equal to the number of pixels which make up one scanning line when the reader is in use. For a document of size A4 this number equals 1728. The eight bit words are generated by a microprocessor 19. Each of these words has its most significant bit set to 1 and the other bits set to zero. The words are written into said storage device 8. which is preferably a 2×8 Kbit random access memory device (RAM). The words are transferred to the storage device through a bi-directional buffer 7 which controls the data-flow to or from microprocessor 19. Data words of 8 bits are stored in RAM locations defined by addresses which are generated by the microprocessor and are fed to the RAM storage through the multiplexer 9.

An image sensor e.g. a solid-state charge coupled device array is exposed to a white reference line during a predetermined integration time. This integration time is a constant period of time during which the sensor is exposed to light reflected from the pixels of the reference line and energises the sensor; in the case of a CCD sensor, the accumulated charge packets are after this integration time transferred to a read-out register, shifted to the output terminal 17 of the electro-optical reader and read out.

The signal at the CCD output should be a constant signal corresponding with the white video level but in most cases it is not, because errors occur for reasons hereinbefore described.

On command of microprocessor 19, a first correction word checking cycle commences. Multiplexer 9 transfers the addresses generated by a pixel counter 10 to storage device 8. A first initial eight bit word is selected, read out from the storage device, delayed in a delay register 11 and fed to the digital input terminal of a multiplying digital-to-analogue convertor (DAC) 13. The analoque input terminal 15 of the DAC is connected to the output terminal of the read-out register 20 into which the charges accumulated in the sensor array were transferred following the exposure to the pixels of the reference line as hereinbefore referred to.

The feeding of the first initial eight bit word into DAC 13 coincides with the feed into the DAC, via terminal 15, of a first video signal (charge packet) from the aforesaid read-out register associated with the sensor array. The first video signal represents the output of the sensor responsive to its exposure to the first pixel of the white reference line.

The DAC 13 operates in the multiplying mode so that its output signal delivered at 17 is equal to the said first video signal from the sensor read-out register, amplified by the correction factor represented by the initial eight-bit digital word which has been read out of storage device 8.

The amplified signal delivered by the DAC 13 is compared in a comparator device 14 with a video reference signal supplied at 16. This reference signal corresponds with a constant white video level.

The result of this comparison is represented by a bit, the compare bit, which is transmitted from the comparator 14 into a delay register 12. This delay register is also fed with signals corresponding with the first seven bits of the first initial correction word which was used in DAC 13 in this development cycle. The aforesaid comparison signal which feeds into the delay register 12 combines with those seven bits to form the least significant. i.e. the last, bit of an eight-bit word which feeds back into RAM 8. This word which feeds back into the RAM corresponds with the first initial word unless the comparison signal generated in that first checking cycle was "1". in which case the word differs from the initial word in that its last bit is "1" instead of "0".

Next a second initial eight bit word has been read out from storage device 8 to commence a first checking cycle in respect of that word. The second initial eight-bit word feeds into the DAC 13 in synchronism with the feed of the second video signal into the DAC from the sensor read-out register, this second signal being the sensor output responsive to its exposure to the second pixel of the white reference line. The first development cycle in respect of that second word proceeds in the same manner as that of the first word and likewise leads to formation of an eight-bit word which feeds back into the storage device at the same address as that from which the second initial eight-bit word was read out. The word which feeds back corresponds with the second initial word unless the comparison signal generated in the said first checking cycle on that initial word was "1", in which case the word fed back into the storage device differs from the second initial word in that its last bit is "1" instead of "0".

First checking cycles corresponding with those above described for the first and second initial eight-bit words proceed in rapid sequence in respect of the other initial correction words. When all of the first development cycles have been completed all of the words which are then in the storage device 8 are processed into new words which become subjected to a sequence of second checking cycles, one for each word. For this processing, multiplexer 9 changes over to addresses coming from the microprocessor and data are read through buffer 7. The microprocessor develops each of the eight-bit words in dependence on the value of its least significant bit. In the case that this least significant bit is "1" the most significant. i.e. the first, bit of the word is changed to "0". Otherwise the first bit is left unchanged. However the second bit of every one of the words is changed from "0" to "1". The resulting processed words are then written back into the RAM 8 on their original addresses.

The foregoing steps complete a first stage of the successive approximation procedures performed in respect of the multiplicity of correction words. The steps are repeated a further seven times to complete the successive approximation procedure. The comparison bit generated in each of the second checking cycles determines whether or not what is then the second most significant bit of the word being checked in that cycle is changed to "1" or is left unchanged at the time its third bit is changed to "1". The comparison signal generated in each of the third checking cycles determines whether or not the third most significant bit of the word being checked in that cycle is changed to "1" or is left unchanged at the time the fourth bit of that word is changed to "1", and so on.

When the successive approximation procedure has been completed. thereby calibrating the reader ready for use in document reading, the correction circuit is switched into its document reading mode in which the developed correction words will perform their sensor output correcting function during normal document reading operations. In this document reading mode, the analogue video signal elements from the sensor are multiplied by the developer correction factors read out from the RAM 8 but of course the amplified signals are not passed to the comparator 14, but are transmitted via the reader output terminal 17.

It will readily be appreciated that the described correction circuitry can easily be modified to suit the development of correction words with a bit number other than eight.

Figures 4A, 4B:
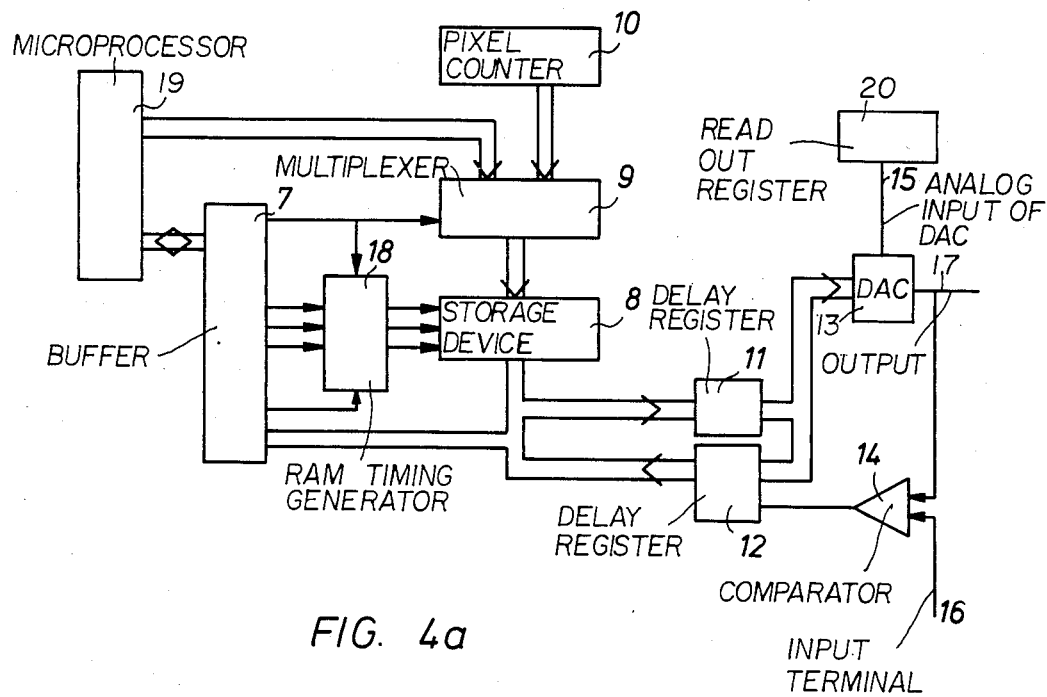
FIG. 4a shows the same apparatus with an incorporated random access memory timing generator (RTG)
FIG. 4b is a table representing the different operating modes of the random access memory timing generator.

FIG. 4a shows the same correction circuit wherein however a RAM timing generator (RTG) 18 is incorporated which generates on command of microprocessor 19 the signals for selecting the different modes wherein the correction circuit is switched. The different modes are referred to in the table : FIG. 4b.

For operating in Mode 1, a "mode select" (MS) terminal is set "high" and a "start correction" (SC) terminal is set "low". In this mode multiplexer 9 connects the addresses generated by microprocessor 19 to RAM 8 and the microprocessor fills the RAM with the initial correction words. Mode 2 is initiated by the switching of both the MS an the SC terminal to "low". In Mode 2, multiplexer 9 connects the pixel counter 10 with RAM 8 and the RAM is put into the read mode so that the correction words in the ram can be read out. Triggering of the SC terminal with a positive edge brings the RTG 18 into Mode 3 for performing a sequence of checking cycles (one cycle in respect of each correction word). The RTG is held in this mode while the sequence of first checking cycles in respect of the correction words are being performed, and until all of correction words having their least signficant bits formed by the comparison sigalsgenerted in those cycles have been written into RAM 8. Then the RTG 18 is again switched into Mode 1. In this Mode, the words in RAM 8 are processed by the microprocessor 19 in accordance with the bit change rule hereinbefore desribed. RTG 18 is thereafter switched into Mode 2, then into Mode 3 and then back to Mode 1 again, as many times as is required to complete the successive approximation procedure. At the end of these operations the developed correction words representing the required correction factors are in position in the RAM ready to fulfil their correcting function in normal document reading operations.

We claim:

1. A method of generating correction factors with which a video signal, output of a sensor in an electro-optical document reading apparatus, is to be amplified in every pixel in order to compensate for apparatus performance anomalies, which method comprises the steps of developing an n-bit binary code correction work for an output value pertaining to each pixel in a scanning line or area taken as reference with which said output value has to be amplified to make it substantially equal to a predetermined reference signal level by performing a succesibe approximation procedure, said procedure comprising a sequence of checking cycles each including the steps of ampliying a sensor signal responsive to a uniformly irradiated line or area taken as reference with an initial n-bit binary code work having its most significant bit set to one and its other bits set to zero to give a modified video response signal and comparing said modified video response signal with said predetermined reference signal level to give a comparison signal; and changing the correction words bit by bit in dependance on said comparison signal and by changing a lower significant bit next to an amended bit to one in order to bring each of the correction works progressively into approximation with a required coded correction factor; wherein the successive approximation procedures for developing the plurality of correcting words are nested by performing in immediate succession to each other the sequence of checking cycles in respect of the most significant bits of different correction words, then performing in imediate succession to each other the sequence of checking cycles in respect of a next significant value bit of those correction words and so on until the successive approximation procedures for all the correction words are completed each sequency of checking cycles being performed after an exposure of said sensor to said uniformly illuminated reference line or area.

2. A method according to claim 1, wherein said line or area taken as reference to which the sensor is exposed while the correction words are being developed, is a white surface and said predetermined reference signal level is a white video level.

3. A method according to claim 1, wherein a compare bit constituting the comparison signal generated in each of the checking cycles pertaining to each of the correction words is written into the correction word at the least significant bit of said correction word.

4. A method according to claim 1, wherein said initial n-bit binary code words are written into a RAM and wherein after each checking cycle pertaining to each of said correction words and amendment of said correction words in reading of correction words in succession out of said RAM is synchronized with transmission of said video signal to be amplified by those correction words.

* * * * *